United States Patent [19]

Takei

[11] Patent Number: 5,416,396
[45] Date of Patent: May 16, 1995

[54] LINEAR ENCODER AND A GUIDE UNIT ON WHICH IT IS EQUIPPED

[75] Inventor: Seiji Takei, Kanagawa, Japan

[73] Assignee: Nippon Thompson Co., Ltd., Tokyo, Japan

[21] Appl. No.: 73,086

[22] Filed: Jun. 8, 1993

[30] Foreign Application Priority Data

Jun. 12, 1992 [JP] Japan .................................. 4-179292

[51] Int. Cl.$^6$ .......................................... G05B 11/58
[52] U.S. Cl. ...................................... 318/653; 318/687
[58] Field of Search ................. 318/135, 38, 687, 653, 318/647, 604, 605

[56] References Cited

U.S. PATENT DOCUMENTS

| | | | |
|---|---|---|---|
| 4,509,001 | 4/1985 | Wakabayashi et al. | 318/687 |
| 4,958,115 | 9/1990 | Miller | 318/662 |
| 5,047,676 | 9/1991 | Ichikawa | 310/12 |
| 5,198,740 | 3/1993 | Jacobsen et al. | 318/687 |
| 5,229,669 | 7/1993 | Takei | 310/12 |
| 5,289,088 | 2/1994 | Andoh | 318/135 |

Primary Examiner—William M. Shoop, Jr.
Assistant Examiner—Brian Sircus
Attorney, Agent, or Firm—Sughrue, Mion, Zinn, Macpeak & Seas; Richard C. Turner

[57] ABSTRACT

A linear encoder detects the position of relative motion of two objects by providing an electromagnetic conversion element on one of the objects opposing a magnetic circuit on the other object. The magnetic circuit is composed of a yoke in which a plurality of projections, each acting as a magnetic pole, are formed so as to be arranged in a row at prescribed intervals in the direction of relative motion of the two objects. A permanent magnet is joined to the yoke.

7 Claims, 8 Drawing Sheets ized, long permanent magnet 8, wherein magnetic

LINEAR ENCODER AND A GUIDE UNIT ON WHICH IT IS EQUIPPED

BACKGROUND OF THE INVENTION

1. Field of the Invention

The present invention relates to a linear encoder performing positional detection of relative motion that is used in mechanisms that perform said relative motion in, for example, machine tools and industrial robots, and a guide unit formed by adding a guiding device, having a track rail and so forth, that guides said relative motion, to said linear encoder.

2. Description of the Prior Art

An example of an apparatus of the prior art containing this type of guide unit is the direct drive unit indicated in FIG. 1. Furthermore, in contrast to a guide unit comprising the above-mentioned linear encoder and guiding device, this direct drive unit is further given, for example, a linear motor for the driving device.

As indicated in FIG. 1, said direct drive unit has two track rails 2, that are mounted in parallel on base 1 and in which tracks are formed in the lengthwise direction in each to serve as a guiding device, and a slider 4 that is straddled across both said track rails 2 and guided by said tracks. In addition, a linear motor has a primary side (not shown) and a secondary side 6. Said primary side is composed of mutually connected permanent magnets and electromagnets, and attached to the bottom surface of said slider 4. The secondary side 6 is composed of rectangular members wherein a plurality of inductor teeth (reference numeral not shown), having high magnetic permeability, are formed so as to be arranged in a row in the direction of the tracks. These inductor teeth and the magnetic poles of the above-mentioned electromagnets are arranged relative to each other.

On the other hand, a linear encoder is arranged on base 1 along one of track rails 2. Said linear encoder has a detected element in the form of multipolar magnetized, long permanent magnet 8, wherein magnetic poles (N and S) are arranged in alternating fashion in a direction parallel to the tracks of said track rails 2, and an electromagnetic conversion element (not shown) in the form of a detecting element mounted on the bottom surface of the side of slider 4 so as to be able to oppose said permanent magnet 8. The current position of slider 4 can be detected from the output of said electromagnetic conversion element that moves together with said slider 4 so as to travel longitudinally along permanent magnet 8.

Furthermore, reference number 9 in FIG. 1 indicates a cable guide housing a connection cable (not shown) for supplying a power source to the above-mentioned primary side of the linear motor, as well as for obtaining the output generated by the above-mentioned electromagnetic conversion element. As indicated in this figure, this cable guide 9 is composed of a plurality of links coupled in a row so as to be able to mutually pivot freely. Together with being formed so that said connection cable maintains a prescribed curvature even during movement of slider 4, it also serves to protect said connection cable from damage.

In the linear encoder equipped on the above-mentioned direct drive unit, since permanent magnet 8 is a multipolar magnetized permanent magnet, said linear encoder has the shortcomings of production of this type of multipolar permanent magnet being both relatively difficult as well as resulting in increased costs.

SUMMARY OF THE INVENTION

Thus, in consideration of the above-mentioned shortcomings of the prior art, a first object of the present invention is to provide a linear encoder having both a simple constitution and low costs. In addition, a second object of the present invention is to provide a guide unit equipped with said linear encoder by adding said linear encoder to a guiding device composed of a track rail and so forth.

The present invention is a linear encoder that performs positional detection of relative motion of two objects, comprising: an electromagnetic conversion element provided on one of the objects performing relative motion; and, a magnetic circuit provided on the other object performing relative motion corresponding to the above-mentioned first object performing relative motion so as to be able to oppose the above-mentioned electromagnetic conversion element; wherein, the above-mentioned magnetic circuit is composed of a yoke in which a plurality of projections are formed so as to be arranged in a row at prescribed intervals in the direction of the above-mentioned relative motion, as well as be able to oppose the above-mentioned electromagnetic conversion element, and a permanent magnet joined to the above-mentioned yoke; wherein, each of the above-mentioned projections is composed to act as a magnetic pole.

In addition, the present invention is a guide unit equipped with: a track rail in which tracks are formed in the lengthwise direction; a slider guided by the above-mentioned tracks; and, a linear encoder for detecting the position of the above-mentioned slider with respect to the above-mentioned track rail; wherein, the above-mentioned linear encoder is composed of a plurality of electromagnetic conversion elements provided in a row at prescribed intervals along the above-mentioned tracks on the above-mentioned track rail, and a magnetic circuit arranged on the above-mentioned slider so as to be able to oppose the above-mentioned electromagnetic conversion elements; and, the above-mentioned magnetic circuit is composed of a yoke, in which a plurality of projections are formed so as to be arranged in a row at prescribed intervals parallel to the above-mentioned tracks, as well as be able to oppose the above-mentioned electromagnetic conversion elements, and a permanent magnet joined to the above-mentioned yoke; wherein, each of the above-mentioned projections is composed to act as a magnetic pole.

DESCRIPTION OF THE PREFERRED EMBODIMENTS

The following provides an explanation of the direct drive unit, including a linear encoder and guide unit, in the form of embodiments of the present invention with reference to the drawings.

First, the following provides an explanation of the constitution of the guide unit pertaining to the present invention.

Figure 1:
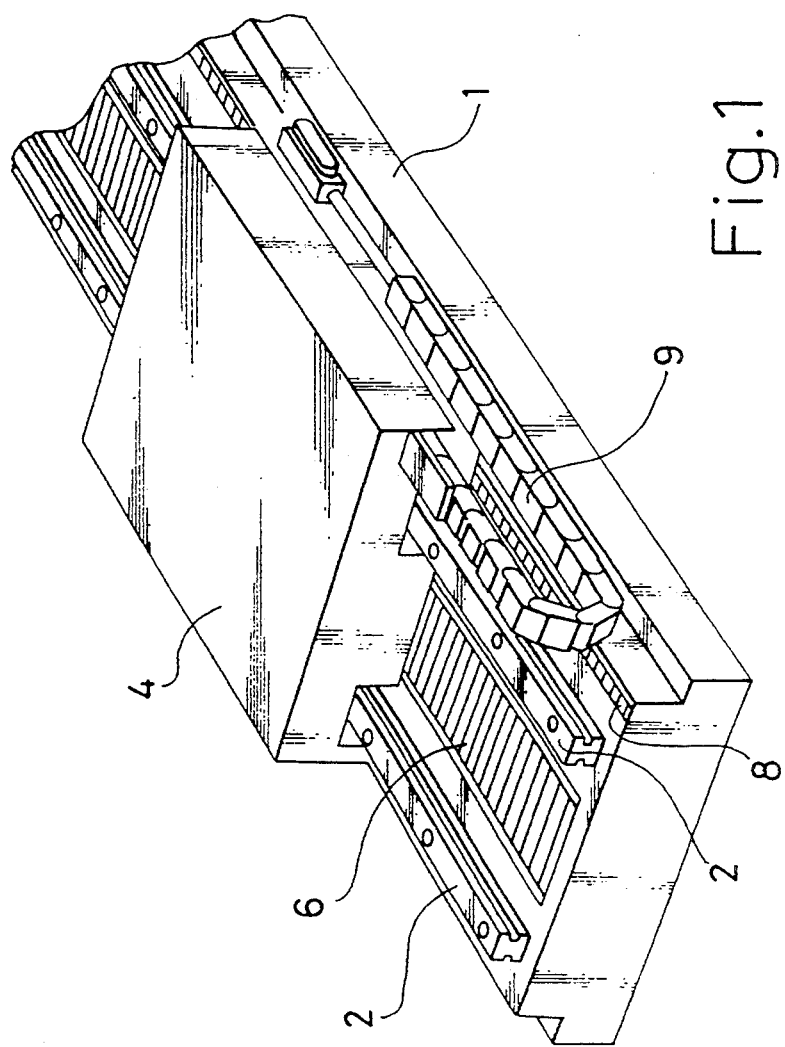
FIG. 1 is a perspective view of the essential components of a direct drive unit containing a linear encoder and guide unit of the prior art.
Figure 2:
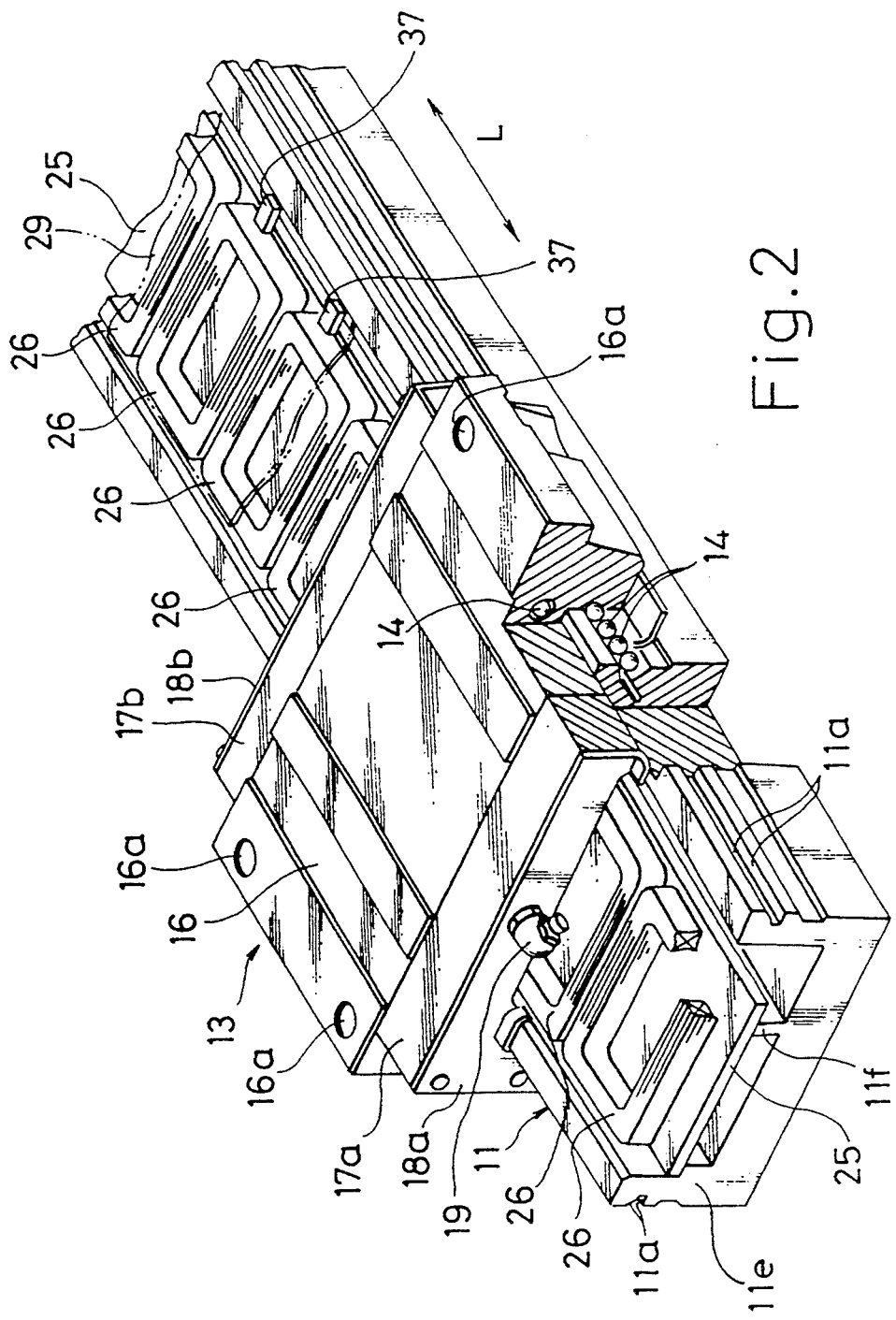
FIG. 2 is a perspective view, including a partial cross-section, of the essential components of the direct drive unit containing a linear encoder and guide unit pertaining to the present invention.
Figure 3:
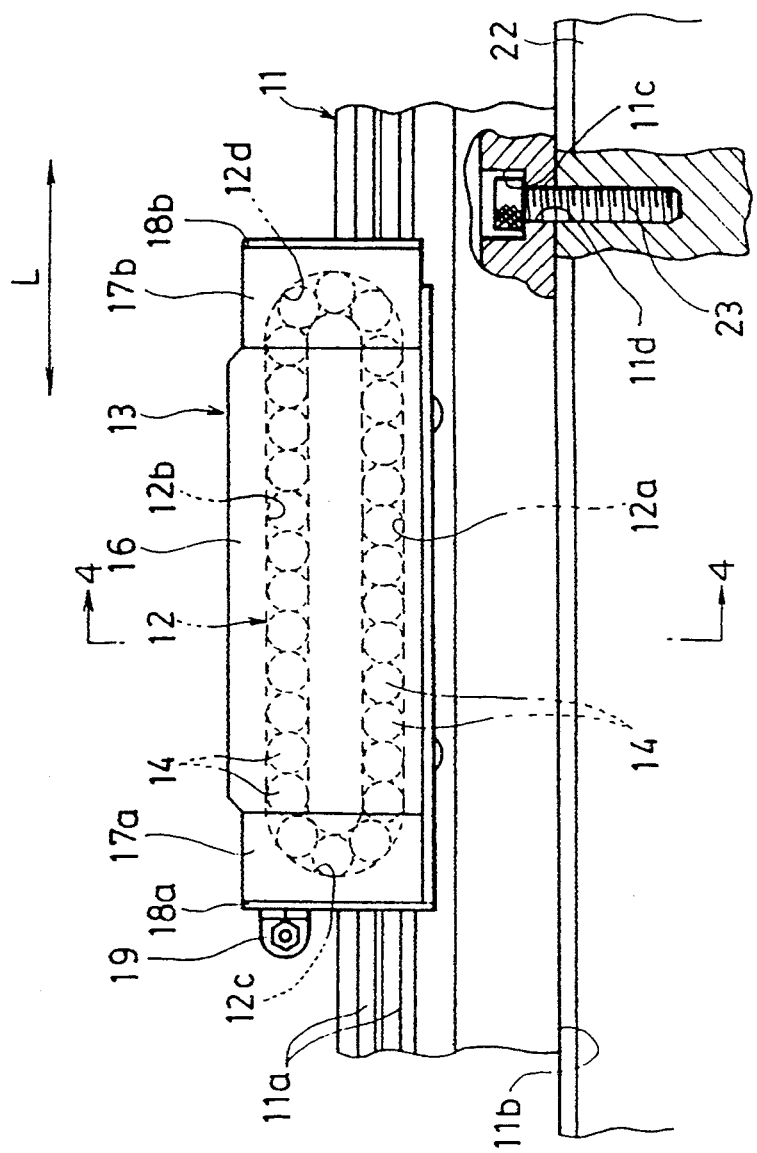
FIG. 3 is a side view, including a partial cross-section, indicating the direct drive unit indicated in FIG. 2 provided on a base.
Figure 4:
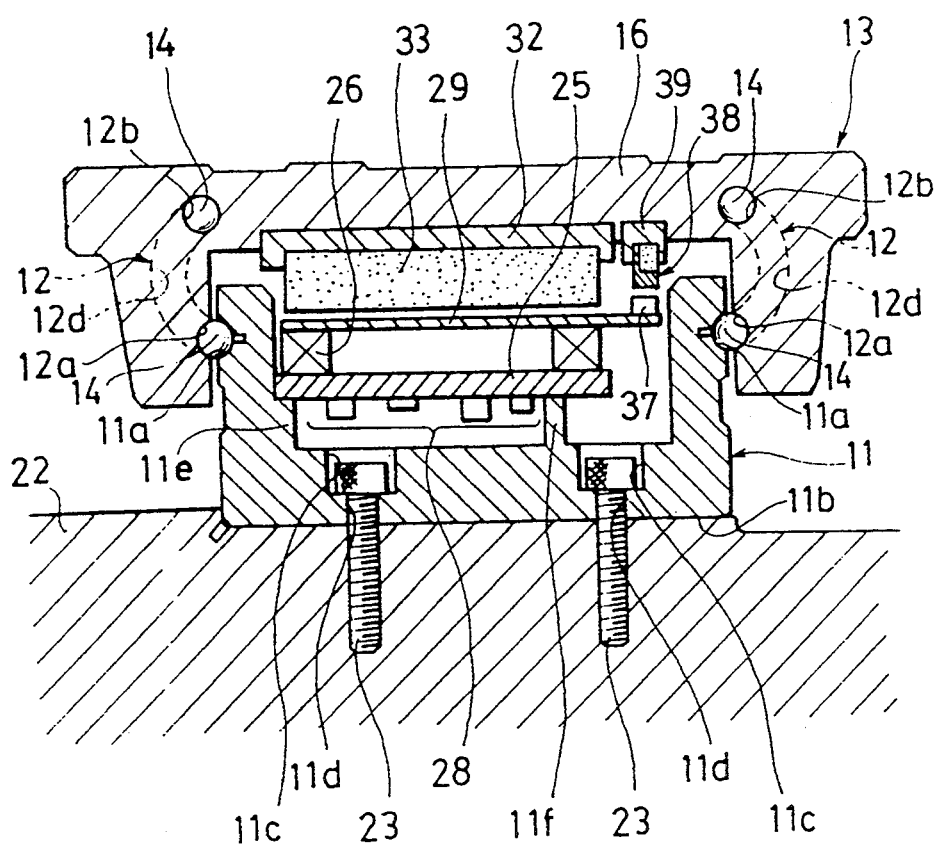
FIG. 4 is a cross-sectional view taken along line A—A relating to FIG. 3.

As indicated in FIGS. 2 through 4, this guide unit has track rail 11, formed so that the shape of the cross-section perpendicular to its lengthwise direction is roughly that of the letter "U" opened upward, rolling element circulating path 12 (reference numeral indicated in FIGS. 3 and 4, to be described in detail to follow), and a slider able to perform relative motion with respect to said track rail 11 in the form of sliding unit 13. One each of tracks having a roughly semi-circular cross-section, in the form of track grooves 11a, are formed in the lengthwise direction on the right and left outer sides of track rail 11. However, the number of these track grooves 11a is not necessarily limited to two. Two of the above-mentioned rolling element circulating paths 12 are provided to correspond to each of these track grooves 11a. A plurality of balls 14 are arranged and contained within said rolling element circulating path 12, in the form of rolling elements that bear the load between track rail 11 and sliding unit 13 by circulating while rolling over these track grooves 11a accompanying movement of sliding unit 13.

Sliding unit 13 has casing 16 straddled across track rail 11, a pair of end caps 17a and 17b connected to both ends of said casing 16, and two seals 18a and 18b attached to each of the outer surfaces of said end caps 17a and 17b. Furthermore, grease nipple 19, for supplying grease to the above-mentioned balls 14, is attached to end cap 17a. As indicated in FIGS. 3 and 4, each Polling element circulating path 12 is composed of load bearing track groove 12a and return path 12b formed linearly and mutually in parallel on both the left and right ends of casing 16, and a pair of roughly semi-circular direction changing paths 12c and 12d that are formed in both end caps 17a and 17b and that connect said load bearing track groove 12a and return path 12b at both of their ends. Furthermore, the above-mentioned load bearing track groove 12a is opposed to track groove 11a of track rail 11.

The guide unit having the above-mentioned constitution is arranged on, for example, a frame indicated in FIGS. 3 and 4 (the entire frame is not shown), or in other words, an object of the stationary side in the form of flat base 22. Track rail 11 is fastened to said base 12 by a plurality of fastening members in the form of bolts (with hexagon sockets) 23. Therefore, track rail 11 has flat mounting surface 11b on its bottom for mounting to base 22. Furthermore, as indicated in FIGS. 3 and 4, countersunk portions 11c, having a diameter larger than the heads of said bolts 23, and holes 11d, having a diameter slightly larger than the threaded portions of bolts 23, are arranged mutually concentrically and in a row in the lengthwise direction of said track rail 11 in the bottom of said track rail 11. Bolts 23 are screwed into base 22 by being inserted into said countersunk portions 11c and holes 11d so that they are completely embedded. In addition, as indicated in FIG. 2, a plurality of threaded holes 16a are formed in the upper surface of casing 16 of sliding unit 13 to allow fastening of a workpiece and so forth to said casing 16 by screwing bolts (with hexagon sockets, not shown) into these threaded holes 16a.

The following provides a detailed description of the linear motor provided in the form of a driving device.

As indicated in FIGS. 2 and 4, the primary side of said linear motor has rectangular plate-shaped coil yoke 25, provided so as to extend over roughly the entire length of track rail 11 on said track rail 11, and a plurality of armature coils 26 arranged in a row on said coil yoke 25. Furthermore, coil yoke 25 is arranged near the bottom of track rail 11, which is formed so that the shape of its cross-section is in the shape of the letter "U" opened upward. More specifically, one each of support ledge 11e and support projection 11f is formed mutually in parallel near the bottom of track rail 11 in said track rail 11. Coil yoke 25 is supported by said support ledge 11e and support projection 11f, and mounted to track rail 11 with adhesive or small screws and so forth. In addition, as indicated in the drawings, each armature coil 26 is respectively wound around, for example, a roughly rectangular loop (and including those shaped in the form of a diamond or parallelogram).

As indicated in FIG. 4, electronic component group 28, consisting of an IC, transistors and so forth that compose a control circuit, is provided on the lower surface of coil yoke 25. Wiring for electrically connecting these electronic components is provided by etching and so forth on the upper surface of coil yoke 25.

In addition, as indicated in FIGS. 2 and 4, thin boards 29, made of plastic and so forth, are attached to the upper surface of each armature coil 26 for mounting each of said armature coils.

On the other hand, the secondary side is composed in the manner described below.

Figure 5:
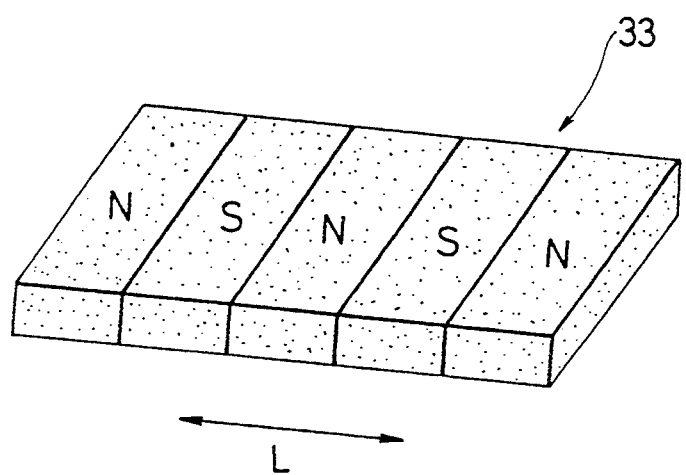
FIG. 5 is a perspective view of a field magnet equipped on the direct drive unit indicated in FIGS. 2 through 4.

As indicated in FIG. 4, said secondary side has magnet yoke 32 attached to the lower surface of casing 16, a constituent member of sliding unit 13, and field magnet 33 composed of a permanent magnet attached to the bottom of said magnet yoke 32 in opposition to each of the above-mentioned armature coils 26 of the primary side. As is clear from FIG. 5, field magnet 33 is formed overall roughly into the shape of a rectangular plate (including that formed into the shape of a diamond or parallelogram), and is magnetized so that a plurality of, and in this case 5, N and S magnetic poles are alternately arranged along the lengthwise direction of track rail 11, or in other words, direction L, in which there is relative movement of the primary and secondary sides.

The following provides an explanation of the linear encoder for positional detection of sliding unit 13 with respect to track rail 11.

As is indicated in FIGS. 2 and 4, board 29 provided on track rail 11 extends farther to the outside than the edge of armature coil 26, and a detecting element in the form of electromagnetic conversion element 37 is mounted on the top (or bottom) of this extending portion. Said electromagnetic conversion element 37 detects changes in magnetic field in the form of changes in the value of electrical resistance, and a plurality of said electromagnetic conversion elements 37 are, for example, arranged in a row along the track at prescribed intervals at locations corresponding to each armature coil 26 as indicated in FIG. 2.

In addition, a detected element in the form of magnetic circuit 38 is mounted by means of magnet yoke 39 on the bottom surface of sliding unit 13 so as to be able to be in opposition to these electromagnetic conversion elements 37. Changes in the magnetic field accompanying movement of sliding unit 13 are then detected by said electromagnetic conversion elements 37.

Figure 6:
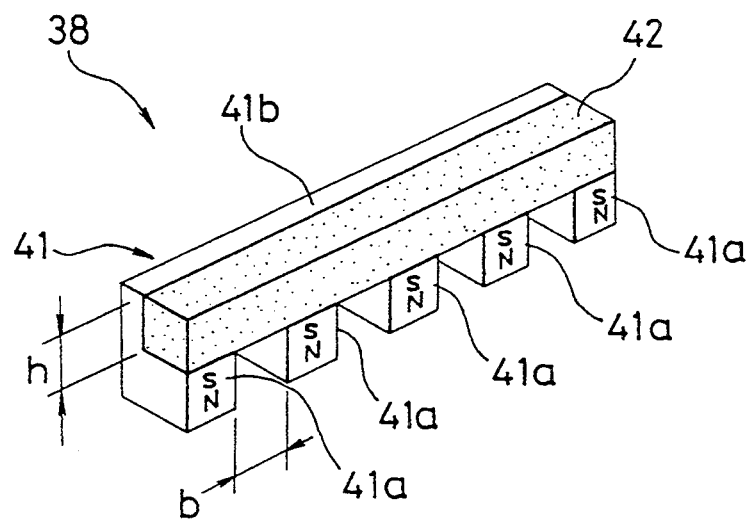
FIG. 6 is a perspective view of the magnetic circuit that is a constituent member of the linear encoder equipped on the direct drive unit indicated in FIGS. 2 through 4.
Figure 7:
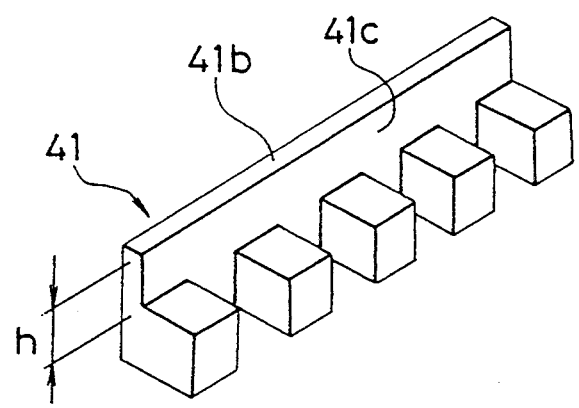
FIG. 7 is a perspective view of the yoke that is a constituent member of the magnetic circuit indicated in FIG. 6.
Figure 8:
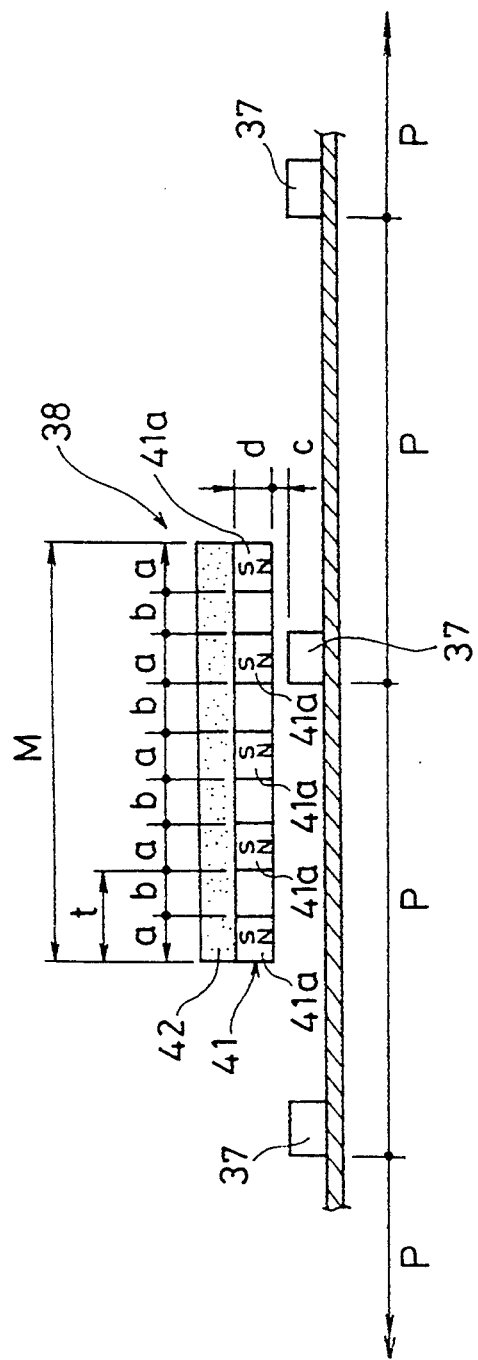
FIG. 8 is an enlarged explanatory drawing of the essential components of the linear encoder pertaining to the present invention.

The following provides a detailed explanation of the above-mentioned linear encoder based on FIGS. 6 through 8.

First, the following provides a detailed description of the detected element in the form of magnetic circuit 38.

As indicated in FIG. 6, magnetic circuit 38 is composed of yoke 41, in which a plurality of projections 41a are formed in a row at prescribed interval b in the direction of the track as well as able to oppose the above-mentioned electromagnetic conversion elements 37, and unipolar permanent magnet 42 joined to said yoke 41. As indicated in the drawing, each of projections 41a of yoke 41 act as magnetic poles. Furthermore, as is clear from said composition, the surfaces of each of said magnetic poles that oppose the above-mentioned electromagnetic conversion elements 37 are all the same poles (either N or S). However, the surface opposing electromagnetic conversion elements 37 is that of the N pole in the present embodiment. In addition, the number of these magnetic poles is five in the present embodiment.

As is clear from FIG. 7, yoke 41 has base portion 41b, formed into the shape of a flat rectangular parallelopiped and arranged to extend in the direction of the above-mentioned tracks, and five protrusions, each in the shape of rectangular parallelopipeds, formed into a single unit on the lateral surface 41c of base portion 41b and extending perpendicularly with respect to said track direction in the form of teeth. Each of said protrusions thus forms the above-mentioned projections 41a. As indicated in the drawing, each of said protrusions (projections 41a) is formed at height h with respect to base portion 41b. Permanent magnet 42 is then formed into the shape of a rectangular parallelopiped, and joined to the lateral surface 41c of this base portion 41b and to each of the protrusions (projections 41a).

Yoke 41, having the above-mentioned constitution, can be easily formed by performing cutting processing and so forth on a material having high magnetic permeability. Since a multipolar magnetic circuit 38 can be obtained simply by joining unipolar permanent magnet 42 to said yoke 41, the constitution of a linear encoder containing said magnetic circuit 38 is extremely simple thereby accomplishing reduced costs.

In addition, yoke 41 and permanent magnet 42 are mutually joined by adhesive. The use of adhesive in this manner allows the assembly of magnetic circuit 38 to be extremely simple, thereby leading to a further reduction in costs.

FIG. 8 is an enlarged view of the position and length of the above-mentioned magnetic circuit 38 with respect to the direction of movement of sliding unit 13 (indicated in FIGS. 2 through 4), or in other words, the direction in which electromagnetic conversion elements 37 are arranged.

In said constitution, when magnetic circuit 38 moves along the tracks together with sliding unit 13, a change in the resistance value occurs corresponding to the change in the magnetic field in electromagnetic conversion elements 37 in opposition to said magnetic circuit 38. After magnetic circuit 38 passes over a specific electromagnetic conversion element 37, similar changes in the magnetic field are induced in the adjacent electromagnetic conversion element 37. As a result, changes in the resistance value occur successively in each of the electromagnetic conversion elements 37. The position of sliding unit 13 can then be determined by detecting the changes in output from each of these electromagnetic conversion elements 37 based on the changes in the resistance values, processing those output signals and performing the necessary arithmetic computations. For example, after setting a reference position in advance, it should then be determined from what electromagnetic conversion element 37 an output was produced with respect to said reference position.

Furthermore, as described above, since magnetic circuit 38 is a multipolar magnetized circuit, an output signal can be obtained that corresponds to the number of each magnetic pole with each electromagnetic conversion element 37. As a result, the resolution of position detection can be improved. However, in cases when such a degree of high resolution is not required, magnetic circuit 38 may be composed of a single magnetic pole instead of the multiple number of magnetic poles as described above.

In addition, electrical division and processing of the output waveforms of electromagnetic conversion elements 37 allows resolution to be increased further.

As is clear from the explanation thus far, in the present embodiment, since electromagnetic conversion elements 37, connected with a connection cable for obtaining of their output, are provided on the stationary side, together with the constitution being simple because a connection cable is not required to be pulled around, this constitution also offers the advantage of promoting smooth operation of the moving side.

In addition, according to said constitution, since a long permanent magnet (8) is not required as in the manner of the apparatus of the prior art, this constitution also offers the advantage of allowing the apparatus to be compact in size.

In the present embodiment, the following constitution is employed in order to obtain the output from each electromagnetic conversion element 37 in the most efficient manner.

Namely, as indicated in FIG. 8, when the total length of magnetic circuit 38 in the track direction is taken to be M, and the arrangement pitch of each magnetic pole of said magnetic circuit 38 and each electromagnetic conversion element 37 is taken to be t and p, respectively, a constitution is formed so that $M = p - t$.

Together with this eliminating any dead areas in position detection as a result of any magnetic pole always acting only on a specific electromagnetic conversion element 37, it also results in the obtaining of only one detection output at all times. Thus, signal processing, computation and so forth following detection signal output is performed efficiently.

In addition, as indicated in FIG. 8, if the length of each magnetic pole in the track direction is taken to be a, the interval between magnetic poles is taken to be b (described above), the height of each magnetic pole is taken to be d, and the distance between mutually opposing surfaces of each magnetic pole and each electromagnetic conversion element 37 is taken to be c, it has been confirmed by experiment that by forming said constitution to satisfy each of the formulae below, the output from each electromagnetic conversion element 37 can be obtained both reliably and efficiently.

$$1.5c < a < 2.0c \quad (1)$$

$$1.0a < b < 1.1a \quad (2)$$

$$d > 0.5b \quad (3)$$

Furthermore, if, for example, a<1.5c with respect to the above-mentioned formula (1), the output is no longer obtained. In addition, when a>2.0c, values are set based on disturbance of the output waveform obtained in the form of a sine wave.

Figure 9:
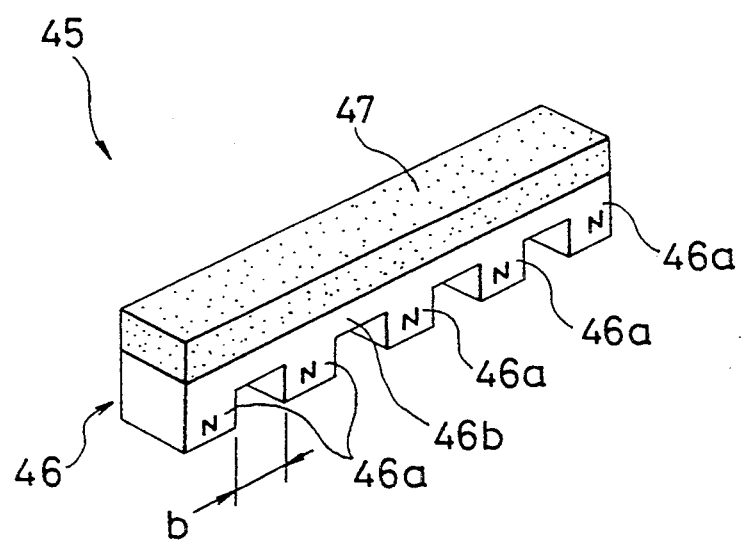
FIG. 9 is a perspective view of a variation of the magnetic circuit that is a constituent member of the linear encoder pertaining to the present invention.

FIG. 9 indicates a variation of the magnetic circuit to be equipped on the linear encoder pertaining to the present invention. As indicated in this drawing, this magnetic circuit 45 is also composed of yoke 46, in which five projections 46a are formed in a row at prescribed interval b in the track direction as well as able to oppose electromagnetic conversion elements 37, and unipolar permanent magnet 47 joined to said yoke 46. These projections 46a also serve as magnetic poles.

More specifically, yoke 46 has base portion 46b, formed into the shape of a flat rectangular parallelopiped and arranged to extend in the above-mentioned track direction, and each of the above-mentioned projections 46a, or in other words, each of the magnetic poles, which are each in the shape of rectangular parallelopipeds, are formed into a single unit in a single plane in the lengthwise direction of said base portion 46b. Permanent magnet 47, formed into the shape of a flat rectangular parallelopiped, is joined to the surface of said base portion 46b lying opposite to projections 46a.

Even if magnetic circuit 45 is used having the constitution described above, the same advantages are offered as in the case of using the above-mentioned magnetic circuit 38.

Furthermore, although a linear motor is used for the driving device in the above-mentioned embodiment, the present invention is not limited to a type that uses a driving device.

In addition, although a guiding device in the form of rolling elements in the form of balls 14 circulating within sliding unit 13 is used in the above-mentioned embodiment, a guiding device of a different constitution may also be applied. In addition, although balls are used for the rolling elements in the above-mentioned embodiment, a constitution may also be employed in which rollers are used.

Moreover, with respect to electromagnetic conversion elements 37 and magnetic circuit 38 (45) that compose the linear encoder, although electromagnetic conversion elements 37 are provided on the stationary side and said magnetic circuit is mounted on the moving side, a constitution may be used wherein the opposite is applied, or in other words, the magnetic circuit is provided on the stationary side and the electromagnetic circuit elements 37 are provided on the moving side.

According to the present invention as explained above, since a multipolar magnetic circuit is formed by simply joining a unipolar permanent magnet to a yoke that can be easily formed by performing cutting processing and so forth on a material having high magnetic permeability, the present invention offers the advantage of the composition being extremely simple as well as being able to achieve reductions in cost.

What is claimed is:

1. A linear encoder that performs positional detection of relative motion of two objects, comprising: an electromagnetic conversion element provided on one of the objects performing relative motion; and, a magnetic circuit provided on the other object performing relative motion corresponding to said first object performing relative motion so as to be able to oppose said electromagnetic conversion element; wherein, said magnetic circuit is composed of a yoke in which a plurality of projections are formed so as to be arranged in a row at prescribed intervals in the direction of said relative motion, as well as to be able to oppose said electromagnetic conversion element, and a permanent magnet joined to said yoke; wherein, each of said projections is composed to act as a magnetic pole.

2. The linear encoder described in claim 1 wherein said yoke has a base portion, formed roughly into the shape of a rectangular parallelopiped and arranged to extend in said direction of relative motion, and a plurality of protrusions, each roughly in the shape of rectangular parallelopipeds, formed into a single unit on the lateral surface of said base portion and extending roughly perpendicularly with respect to said direction of relative motion in the form of teeth, said protrusions form said projections, and said permanent magnet is formed roughly in the shape of a rectangular parallelopiped that is joined to the lateral surface of said base portion and to each of said protrusions.

3. The linear encoder described in claim 1 wherein said yoke has a base portion formed roughly in the shape of a rectangular parallelopiped and arranged to extend in said direction of relative motion, each of said projections are each roughly in the shape of a rectangular parallelopiped and formed in a single plane in the lengthwise direction of said base portion, and said permanent magnet is formed roughly in the shape of a rectangular parallelopiped that is joined to the opposite surface from said surface of said base portion.

4. The linear encoder described in claim 1 wherein said yoke and permanent magnet are integrated into a single unit by joining with adhesive.

5. The linear encoder described in claim 1 wherein a plurality of said electromagnetic conversion elements are arranged at a prescribed interval along the direction of relative motion on the stationary side of either of the objects that perform relative motion, and said magnetic circuit is arranged on the moving side corresponding to said stationary side.

6. The linear encoder described in claim 1, wherein said encoder satisfies the following relationship: M=p−t wherein M is the total length of said magnetic circuit in said direction of relative motion p is an arrangement pitch of said electromagnetic conversion elements in said direction of relative motion, and t is an arrangement pitch of said plurality of magnetic poles in said direction of relative motion.

7. A guide unit equipped with: a track rail in which tracks are formed in the lengthwise direction; a slider guided by said tracks; and, a linear encoder for detecting the position of said slider with respect to said track rail; wherein, said linear encoder is composed of a plurality of electromagnetic conversion elements provided in a row at prescribed intervals along said tracks on said track rail, and a magnetic circuit arranged on said slider so as to be able to oppose said electromagnetic conversion elements; and, said magnetic circuit is composed of a yoke, in which a plurality of projections are formed so as to be arranged in a row at prescribed intervals parallel to said tracks, as well as be able to oppose said electromagnetic conversion elements, and a permanent magnet joined to said yoke; wherein, each of said projections is composed to act as a magnetic pole.

* * * * *